(12) United States Patent
Kim (10) Patent No.: US 8,580,426 B2
(45) Date of Patent: Nov. 12, 2013

(54) SECONDARY BATTERY

(75) Inventor: Dukjung Kim, Yongin-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/137,888

(22) Filed: Sep. 20, 2011

(65) Prior Publication Data
US 2012/0258339 A1    Oct. 11, 2012

(30) Foreign Application Priority Data

Apr. 7, 2011    (KR) .................. 10-2011-0032126

(51) Int. Cl.
*H01M 2/04* (2006.01)
*H01M 2/30* (2006.01)

(52) U.S. Cl.
USPC ........... 429/163; 429/175; 429/178; 429/179; 429/185

(58) Field of Classification Search
None
See application file for complete search history.

(56) References Cited

U.S. PATENT DOCUMENTS

2006/0115727 A1* 6/2006 Kim et al. ............... 429/181
2010/0279156 A1   11/2010 Kim et al.
2011/0039136 A1*  2/2011 Byun et al. ............... 429/56
2011/0223471 A1*  9/2011 Sato et al. .............. 429/172
2012/0202096 A1*  8/2012 Kim ........................ 429/61

FOREIGN PATENT DOCUMENTS

| KR | 10-2003-0032561 A | 4/2003 |
| KR | 10-2008-0072132 A | 8/2008 |
| KR | 10-2011-0005197 A | 1/2011 |

OTHER PUBLICATIONS

Korean Notice of Allowance dated Oct. 8, 2012 for KR 10-2011-0032126, Kim.

* cited by examiner

*Primary Examiner* — Milton I Cano
*Assistant Examiner* — Carmen Lyles-Irving
(74) *Attorney, Agent, or Firm* — Lee & Morse, P.C.

(57) ABSTRACT

A secondary battery includes an electrode assembly having a first electrode plate, a second electrode plate, and a separator disposed between the first and second electrode plates, a case accommodating the electrode assembly, and a cap assembly coupled to the case, the cap assembly including a cap plate sealing the case and having a short-circuit hole, a short-circuit plate covering the short-circuit hole of the cap plate, the short-circuit plate being spaced apart from an outer surface of the cap plate, a reversible plate adjacent the short-circuit hole, and a sealing member between the cap plate and the short-circuit plate.

20 Claims, 7 Drawing Sheets

SECONDARY BATTERY

This application claims priority to Korean application 10-2011-0032126 filed on Apr. 7, 2011.

BACKGROUND

1. Field

Embodiments relate to a secondary battery.

2. Description of the Related Art

Secondary batteries are rechargeable batteries, unlike primary batteries. Among such secondary batteries, a low capacity battery including a battery cell in the form of a pack may be used for small portable electronic devices, e.g., cellular phones and camcorders, and a high capacity battery including dozens of battery cells connected to one another may be used as a motor-driving power source, e.g., for electric scooters, hybrid vehicles, or electric vehicles.

Secondary batteries are manufactured in various shapes, e.g., a cylindrical shape and a prismatic shape. A secondary battery may include an electrode assembly, i.e., an insulating separator between positive and negative electrode plates, placed in a case together with an electrolyte, and a cap plate on the case. The electrode assembly may be connected to positive and negative terminals, which protrude from the cap plate and are exposed to the exterior of the secondary battery.

SUMMARY

An aspect of example embodiments relates to a secondary battery having a sealing member between a short-circuit plate and a cap plate for preventing abnormal operations of the secondary battery caused by permeation of contaminants or damages.

According to at least one of the embodiments, a secondary battery includes an electrode assembly having a first electrode plate, a second electrode plate, and a separator disposed between the first and second electrode plates, a case accommodating the electrode assembly, and a cap assembly coupled to the case, the cap assembly including a cap plate sealing the case and having a short-circuit hole, a short-circuit plate covering the short-circuit hole of the cap plate, the short-circuit plate being spaced apart from an outer surface of the cap plate, a reversible plate adjacent the short-circuit hole, and a sealing member between the cap plate and the short-circuit plate.

The short-circuit plate may include a protrusion inserted through the short-circuit hole.

The protrusion may extend toward the reversible plate.

The protrusion may have a hollow cylindrical shape, a blocking part being disposed inside the protrusion to divide an interior of the protrusion into upper and lower regions.

An edge of the cap plate defining the short circuit hole may have a predetermined inner diameter, the inner diameter of the short-circuit hole directly contacting and surrounding an outer diameter of the protrusion.

The sealing member may include a hole therethrough, the protrusion being inserted into the hole.

The sealing member may include a rubber material, the rubber material being shaped into repeated ridges and furrows on top and bottom surfaces of the sealing member.

An inner diameter of the sealing member may directly contact and surround an outer diameter of the protrusion.

The sealing member may include an adhesive.

The reversible plate and the sealing member may contact opposite surfaces of the cap plate.

The reversible plate may include a downwardly-convex round part and a rim part fixed to the cap plate.

The round part of the reversible plate may be configured to reverse and contact the protrusion of the short-circuit plate, when an inside pressure of the secondary battery is greater than a set value.

The reversible plate may be electrically connected to the second electrode plate.

The short-circuit plate may be electrically connected to the first electrode plate.

An upper insulation member may contact the sealing member, the short-circuit plate, and the cap plate.

The upper insulation member may be disposed between the sealing member and the cap plate.

The battery pack may further include a first electrode terminal inserted through a side of the cap plate, the first electrode terminal including a first collecting plate electrically connected to the first electrode plate, and a first terminal column electrically connected to the first collecting plate and inserted through the cap plate and the short-circuit plate.

The secondary battery may further include a first terminal plate coupled to the first terminal column, the first terminal plate including a terminal coupling part through which the first terminal column is inserted, and a pressure reinforcement part extending horizontally from the terminal coupling part and disposed on a top surface of the short-circuit plate.

The secondary battery may further include an insulation cover configured to cover top and lateral surfaces of the pressure reinforcement part.

The sealing member may be in continuous direct contact with first and second surfaces of the short-circuit plate, the first and second surfaces of the short circuit being outer surfaces and substantially perpendicular to each other.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Korean Patent Application No. 10-2011-0032126 filed on Apr. 7, 2011, in the Korean Intellectual Property Office, and entitled: "Secondary Battery" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer (or element) is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Figure 1:
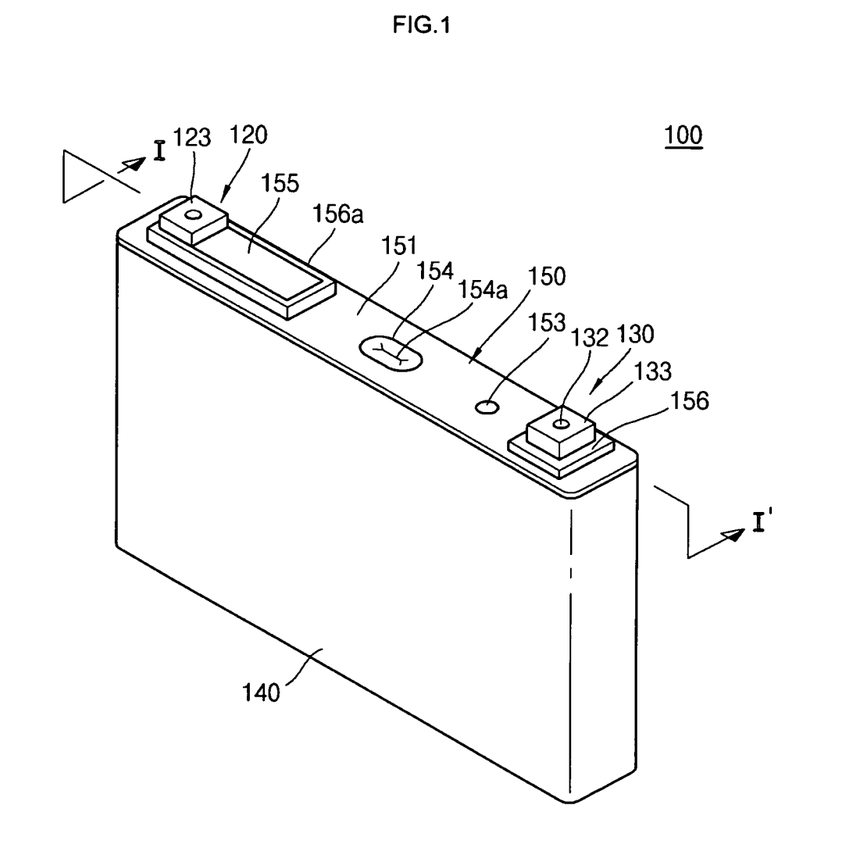
FIG. 1 illustrates a perspective view of a secondary battery according to an embodiment.
Figure 2:
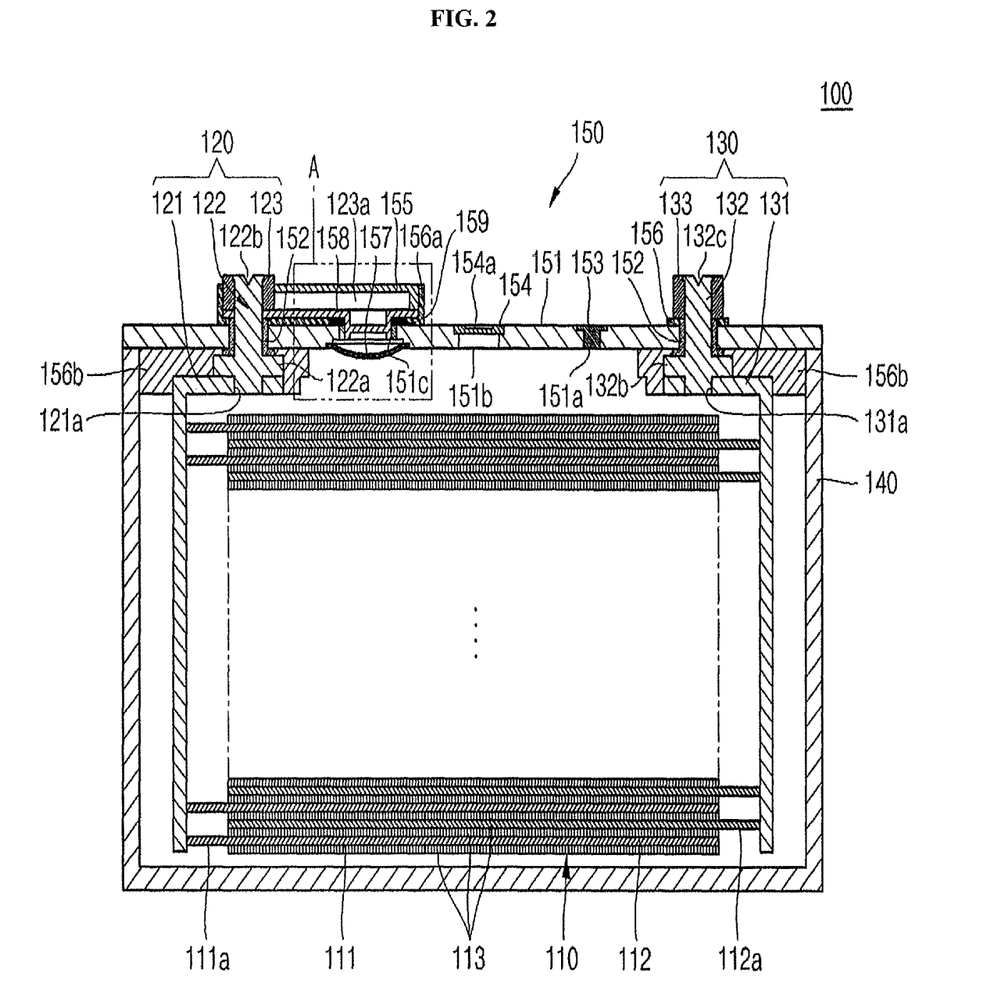
FIG. 2 illustrates a cross-sectional view along line I-I' of FIG. 1.
Figure 3:
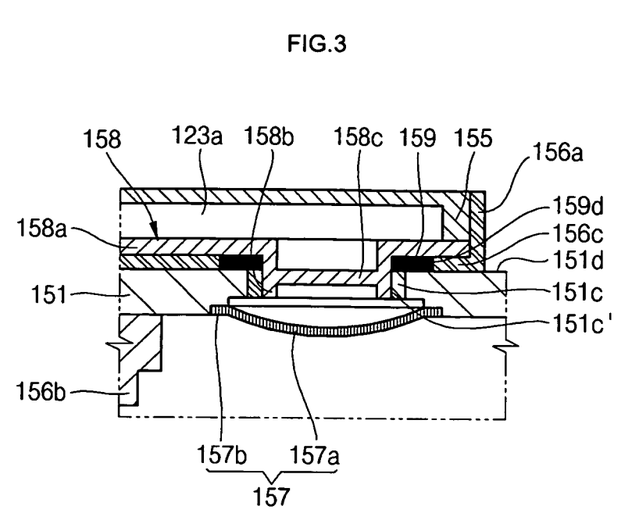
FIG. 3 illustrates an enlarged cross-sectional view of portion A in FIG. 2.
Figure 4A:
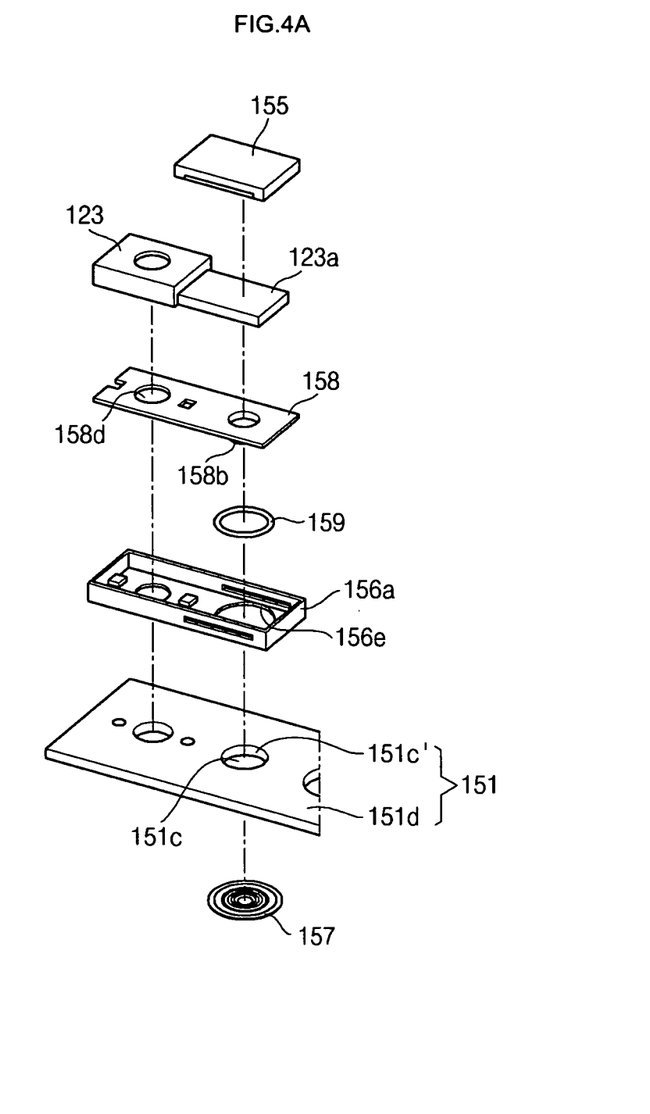
FIG. 4A illustrates an exploded top perspective view of portion A in FIG. 2.
Figure 4B:
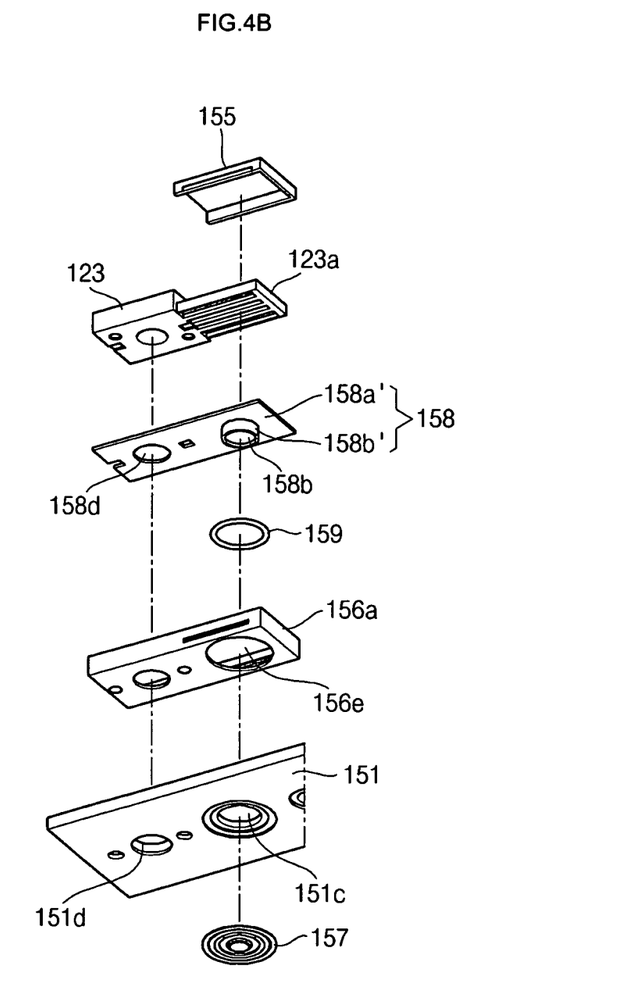
FIG. 4B illustrates an exploded bottom perspective view of portion A in FIG. 2.
Figure 5:
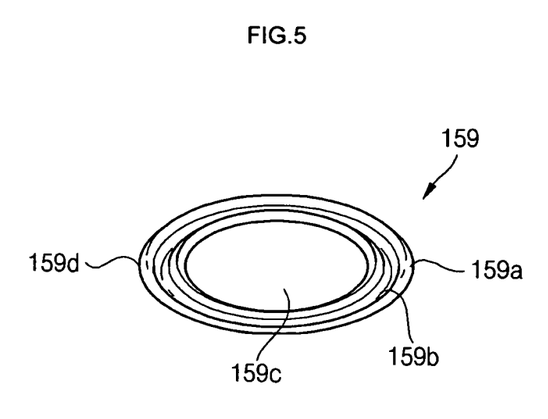
FIG. 5 illustrates a perspective view of a sealing member in a secondary battery according to an embodiment.

Example embodiments will now be described more fully hereinafter with reference to FIGS. 1-5. FIG. 1 is a perspective view of a secondary battery according to an embodiment, FIG. 2 is a sectional view along line I-I' of FIG. 1, FIG. 3 is an enlarged sectional view of portion A in FIG. 2, FIG. 4A is an exploded top perspective view of portion A in FIG. 2, FIG. 4B is an exploded bottom perspective view of portion A in FIG. 2, and FIG. 5 is a perspective view of a sealing member in the secondary battery according to the embodiment.

Referring to FIGS. 1 through 5, a secondary battery 100 of the current embodiment may include an electrode assembly 110, a first electrode terminal 120, a second electrode terminal 130, a case 140, and a cap assembly 150.

The electrode assembly 110 may be formed by winding or stacking a first electrode plate 111, a separator 113, and a second electrode plate 112, which have a thin plate or film shape. The first electrode plate 111 may function as a negative electrode, and the second electrode plate 112 may function as a positive electrode.

The first electrode plate 111 may be formed by applying a first electrode active material, such as graphite or carbon, to a first electrode collector formed of metal foil, such as nickel or copper foil. The first electrode plate 111 may include a first electrode non-coating portion 111a to which the first electrode active metal is not applied. The first electrode non-coating portion 111a functions as a current flow passage between the first electrode plate 111 and the outside of the first electrode plate 111. In the current embodiment, materials that can be used to form the first electrode plate 111 are not limited to the above-mentioned materials.

The second electrode plate 112 may be formed by applying a second electrode active material, such as a transition metal oxide, to a second electrode collector formed of metal foil, such as aluminum foil. The second electrode plate 112 may include a second electrode non-coating portion 112a to which the second electrode active metal is not applied. The second electrode non-coating portion 112a functions as a current flow passage between the second electrode plate 112 and the outside of the second electrode plate 112. In the current embodiment, materials that can be used to form the second electrode plate 112 are not limited to the above-mentioned materials.

The polarities of the first and second electrode plates 111 and 112 may be changed with each other.

The separator 113 may be disposed between the first electrode plate 111 and the second electrode plate 112 to prevent a short circuit and allow movement of lithium ions. The separator 113 may be formed of, e.g., a poly ethylene film, a poly propylene film, or a film including poly ethylene and poly propylene. In the current embodiment, materials that can be used to form the separator 113 are not limited to the above-mentioned materials.

The first and second electrode terminals 120 and 130 are coupled to both lateral end parts of the electrode assembly 110 in a manner such that the first and second electrode terminals 120 and 130 are electrically connected to the first and second electrode plates 111 and 112, respectively.

Substantially, the electrode assembly 110 is accommodated in the case 140 together with an electrolyte. The electrolyte may include an organic solvent, e.g., ethylene carbonate (EC), propylene carbonate (PC), diethyl carbonate (DEC), ethyl methyl carbonate (EMC), and dimethyl carbonate (DMC), and a lithium salt, e.g., $LiPF_6$ or $LiBF_4$. The electrolyte may be liquid, solid, or gel.

The first electrode terminal 120 may be formed of a conductive metal, e.g., copper, and may be electrically connected to the first electrode plate 111. The first electrode terminal 120 may include a first collecting plate 121, a first terminal column 122, and a first terminal plate 123.

The first collecting plate 121 may contact the first electrode non-coating portion 111a protruding from an end of the electrode assembly 110. The first collecting plate 121 may have a reverse L-shape, and a terminal hole 121a may be formed in an upper part of the first collecting plate 121. The first terminal column 122 may be fitted in the terminal hole 121a.

The first terminal column 122 may be electrically connected to the first collecting plate 121 through a cap plate 151 (described later). The first terminal column 122 may be exposed from the topside of the cap plate 151. A flange 122a may be formed on a part of the first terminal column 122 lower than the cap plate 151, so that the first terminal column 122 cannot be separated from the cap plate 151. A part of the first terminal column 122 lower than the flange 122a may be inserted in the terminal hole 121a of the first collecting plate 121. The first terminal column 122 may be electrically insulated from the cap plate 151. A riveting groove 122b may be formed in the topside of the first terminal column 122, so that the first terminal column 122 can be coupled to the cap plate 151 by riveting. That is, the first terminal column 122 may be fixed to the cap plate 151 by riveting the upper end of the first terminal column 122.

The first terminal plate 123 may be coupled to the first terminal column 122. The first terminal plate 123 and the first terminal column 122 may be fixed to the cap plate 151 by riveting. That is, the first electrode terminal 120 may be securely fixed to the cap plate 151 by coupling the first terminal column 122 and the first terminal plate 123, followed by riveting the upper end of the first terminal column 122. The first terminal plate 123 may be formed of aluminum. A terminal penetration hole may be formed in the terminal plate 123, so that the first terminal column 122 may be inserted through the terminal penetration hole. A pressure reinforcement part 123a may extend horizontally from the terminal plate 123, i.e., a terminal coupling part 123, and may be disposed on the top surface of a short-circuit plate 158 (described later), e.g., the pressure reinforcement part 123a may overlap a majority of the top surface of a short-circuit plate 158. When a space between the short-circuit plate 158 and the cap plate 151 is sealed by a sealing member 159, the pressure reinforcement part 123a provides a reinforcement pressure for enhancing the sealing. An insulation cover 155 covers top and lateral surfaces of the pressure reinforcement part 123a, e.g., the pressure reinforcement part 123a may be sealed between the insulation cover and the short-circuit plate 158.

The second electrode terminal 130 may be formed of a conductive material, such as aluminum, and may be electrically connected to the second electrode plate 112. The second electrode terminal 130 may include a second collecting plate 131, a second terminal column 132, and a second terminal plate 133.

The second collecting plate 131 may contact the second electrode non-coating portion 112a protruding from an end of the electrode assembly 110. The second collecting plate 131 may have a reverse L-shape, and a terminal hole 131a may be formed in an upper part of the second collecting plate 131. The second terminal column 132 may be fitted in the terminal hole 131a.

The second terminal column 132 penetrates the cap plate 151 and protrudes upwardly by a predetermined length. The second terminal column 132 may be electrically connected to the second collecting plate 131 at a position under the cap plate 151. The second terminal column 132 may be formed of at least one of, e.g., aluminum, an aluminum alloy, and an equivalent thereof. However, the current embodiment is not limited to such materials. Since the first and second terminal columns 122 and 132 are symmetrical with respect to the center of the cap plate 151, a detailed description of the second terminal column 132 will be omitted. A flange 132b may be formed on a lower part of the second terminal column 132 to prevent the second terminal column 132 from being removed from the cap plate 151. A part of the second terminal column 132 lower than the flange 132b may be inserted in the terminal hole 131a of the second collecting plate 131. The second terminal column 132 may be electrically connected to the cap plate 151.

A riveting groove 132c may be formed in the topside of the second terminal column 132, so that the second terminal column 132 may be coupled to the cap plate 151 by riveting. That is, after coupling the second terminal column 132 and the second terminal plate 133, the second terminal column 132 may be fixed to the cap plate 151 by riveting the upper end of the second terminal column 132.

The second terminal plate 133 may be coupled to the second terminal column 132. The second terminal plate 133 and the second terminal column 132 may be fixed to the cap plate 151 by riveting. That is, the second electrode terminal 130 may be securely fixed to the cap plate 151 by coupling the second terminal column 132 and the second terminal plate 133, followed by riveting the upper end of the second terminal column 132. The second terminal plate 133 may be formed of, e.g., aluminum.

The case 140 may be formed of a conductive metal, such as aluminum, aluminum alloy, or steel plated with nickel. The case 140 may have, e.g., a hexahedral shape with an opening, so that the electrode assembly 110, the first electrode terminal 120, and the second electrode terminal 130 may be inserted and placed in the case 140. FIG. 2 illustrates a state where the case 140 and the cap assembly 150 are coupled to each other, and the opening of the case 140 is not shown. However, the peripheral part of the cap assembly 150 substantially corresponds to the opening of the case 140. The inner surface of the case 140 may be treated to be electrically insulated from the electrode assembly 110, the first and second electrode terminals 120 and 130, and the cap assembly 150. The case 140 may have a polarity. For example, the case 140 may function as a positive electrode.

The cap assembly 150 may be coupled to the case 140. In detail, the cap assembly 150 may include the cap plate 151, gaskets 152, a plug 153, a vent plate 154, the insulation cover 155, a first upper insulation member 156a, a second upper insulation member 156, lower insulation members 156b, a reversible plate 157, the short-circuit plate 158, and the sealing member 159.

The cap plate 151 closes the opening of the case 140. The cap plate 151 may be formed of the same material as that used to form the case 140. The cap plate 151 and the case 140 may have the same polarity. A short-circuit hole 151c may be formed in, e.g., through an entire thickness of, the cap plate 151, so that the reversible plate 157 may be disposed at the short-circuit hole 151c, e.g., the reversible plate 157 may cover and overlap the short-circuit hole 151c from an interior of the case 140.

The gaskets 152 may be formed of an insulating material and may be disposed between the cap plate 151 and each of the first and second terminal columns 122 and 132 to seal gaps between the cap plate 151 and each of the first and second terminal columns 122 and 132. The gaskets 152 prevent permeation of moisture into the secondary battery 100 or leakage of the electrolyte from the secondary battery 100.

The plug 153 closes an electrolyte injection hole 151a of the cap plate 151, and the vent plate 154 is disposed in a vent hole 151b of the cap plate 151. The vent plate 154 may have a notch 154a, so that the vent plate 154 may be opened at a set pressure.

As discussed previously, the insulation cover 155 may cover top and lateral surfaces of the pressure reinforcement part 123a. The insulation cover 155 may be formed of an insulation material. For example, the insulation cover 155 may be locked to the pressure reinforcement part 123a, such that the insulation cover 155 may cover, e.g., overlap, the top and lateral surfaces of the pressure reinforcement part 123a.

The first upper insulation member 156a may be disposed at the first electrode terminal 120, and the second upper insulation member 156 disposed at the second electrode terminal 130.

The first upper insulation member 156a may be disposed between the short-circuit plate 158 and the cap plate 151, and the first terminal column 122 may be inserted in the first upper insulation member 156a. In addition, the first upper insulation member 156a may be in tight contact with the cap plate 151 and the gasket 152. The first upper insulation member 156a may insulate the first terminal column 122 from the cap plate 151. In addition, the first upper insulation member 156a may be in tight contact with an outer surface 159d, i.e., an outermost edge, of the sealing member 159 (described later). Furthermore, the first upper insulation member 156a may be disposed between the sealing member 159 and the cap plate 151 (refer to FIG. 6). The first upper insulation member 156a may include a hole 156e at a position corresponding to the position of the short-circuit hole 151c of the cap plate 151, as illustrated in FIG. 4A. As illustrated in FIGS. 1 and 3, the first upper insulation member 156a surrounds at least part of the short-circuit plate 158, an upper part of the first terminal column 122, the first terminal plate 123, and the insulation cover 155 (described later).

The second upper insulation member 156 may be disposed between the second terminal plate 133 and the cap plate 151, and the second terminal column 132 may be inserted in the second upper insulation member 156. The second upper insulation member 156 insulates the second terminal column 132 from the cap plate 151, as illustrated in FIG. 2.

The lower insulation members 156b may be disposed between the cap plate 151 and each of the first and second collecting plates 121 and 131 to prevent an unnecessary short circuit, as illustrated in FIG. 2.

The reversible plate 157 may be disposed at a first region of the short-circuit hole 151c. That is, as illustrated in FIG. 3, the reversible plate 157 may be disposed on a bottom surface of the cap plate 151 under the short-circuit hole 151c, i.e., to face the interior of the case 140. The reversible plate 157 includes a downwardly-convex round part 157a and a rim part 157b fixed to the cap plate 151. The round part 157a may be disposed at the short-circuit hole 151c, and the rim part 157b may be fixed to a lower region of the short-circuit hole 151c. That is, the rim part 157b may be fixed to a lower rim of the short-circuit hole 151c. The lower rim of the short-circuit hole 151c, i.e., where the rim part 157b is disposed, may be stepped. Therefore, if the inside pressure of the secondary battery 100 increases to a greater value than a set value, e.g., due to overcharging, the round part 157a of the reversible plate 157 may be reversed into an upwardly-convex shape and may be brought into contact with a protrusion 158b (described later) of the short-circuit plate 158 to cause a short circuit. In a normal state, the reversible plate 157 is electrically connected to the second electrode plate 112 through the cap plate 151, i.e., a positive potential is applied to the reversible plate 157 from the second electrode plate 112 through the cap plate 151. As the reversible plate 157 is disposed on the bottom surface of the cap plate 151, structures disposed on the top surface of the cap plate 151 may have various shapes, i.e., the reversible plate 157 may not limit sizes and location of structures on the top surface of the cap plate 151, and the reversible plate 157 may be protected from external impacts.

As further illustrated in FIG. 3, the short-circuit plate 158 may be spaced apart from an upper surface 151d (FIG. 4A) of the cap plate 151 and may cover, e.g., overlap, the short-circuit hole 151c from the outside of the cap plate 151, i.e., the short-circuit plate 158 and the reversible plate 157 may be on opposite surfaces of the cap plate 151. The protrusion 158b may be formed at a position of the short-circuit plate 158 corresponding to the position of the reversible plate 157, e.g., to the position of the round part 157a of the reversible plate 157, as illustrated in FIGS. 3 and 4B. The protrusion 158b may extend through the short-circuit hole 151c toward the reversible plate 157. The diameter of the protrusion 158b may be smaller than the diameter of the short-circuit hole 151c, and the protrusion 158b may be inserted in the short-circuit hole 151c (FIG. 2). For example, an edge 151c' of the cap plate 151 defining the short circuit hole 151c (FIG. 4A) may have a predetermined inner diameter, such that the inner diameter of the short-circuit hole 151c directly contacts and surrounds an outer diameter of the protrusion, i.e., an outer surface 158b' of the protrusion 158b. The protrusion 158b may have a hollow cylindrical shape, and a blocking part 158c may divide the inner region of the protrusion 158b into upper and lower regions.

If the inside pressure of the secondary battery 100 increases to a value greater than a set value, e.g., due to overcharging, the reversible plate 157 may be reversed upwardly, and thus, the protrusion 158b of the short-circuit plate 158 (FIG. 4B) may contact the reversible plate 157 in order to cause a short circuit. A penetration hole 158d may be formed in a horizontal part 158a of the short-circuit plate 158, as illustrated in FIG. 4B, so the first terminal column 122 may be inserted through the penetration hole 158d into the short-circuit hole 151c to electrically connect the short-circuit plate 158 and the first electrode plate 111. That is, the short-circuit plate 158 may have the same polarity as the first electrode plate 111.

The sealing member 159 may be disposed between the cap plate 151 and the short-circuit plate 158, e.g., directly between the upper surface 151d of the cap plate 151 and the horizontal part 158a of the short-circuit plate 158. The sealing member 159 may make tight contact with an outer surface 158a' of the horizontal part 158a of the short-circuit plate 158 and with the outer surface 158b' of the protrusion 158b of the short-circuit plate 158, i.e., with two different outer surfaces of the short-circuit plate 158. For example, the sealing member 159 may directly contact two different surfaces of the short-circuit plate 158 and a horizontal portion 156c of the first upper insulating layer 156a, so the sealing member 159 may be enclosed among the cap plate 151, the first upper insulating member 156a, and the short-circuit plate 158. For example, as illustrated in FIGS. 3 and 4B, the sealing member 159 may surround and be in direct contact with the outer surface 158b' of the protrusion 158b, e.g., may surround an entire outer perimeter of the protrusion 158b. As such, the sealing member 159 may tightly seal a gap between the cap plate 151 and the short-circuit plate 158, thereby preventing permeation of contaminants between the cap plate 151 and the short-circuit plate 158. Accordingly, abnormal behavior of the secondary battery 100 may be prevented.

In detail, referring to FIG. 5, the sealing member 159 may include a hole 159c formed through a center thereof. Therefore, the protrusion 158b may be inserted through the hole 159c of the sealing member 159 to penetrate therethrough. For example, the sealing member 159 may have a continuous frame-shaped structure with a hole in its center, e.g., an O-ring, such that the hole may have a shape corresponding to the shape of the protrusion 158b of the short-circuit plate 158. The sealing member 159 may be formed of a rubber material, and ridges 159a and furrows 159b may be repeatedly formed on top and bottom sides of the sealing member 159. In addition, a diameter of the sealing member 159 may be greater than a diameter of the protrusion 158b, so that the sealing member 159 may be disposed around the protrusion 158b. For example, an inner diameter of the hole in the sealing member 159 may be surround and directly contact an outer diameter of the protrusion 158b, e.g., the inner diameter of the hole in the sealing member 159 may be substantially the same as the outer diameter of the protrusion 158b, so that the sealing member 159 may fit tightly around the protrusion 158b. The sealing member 159 can be brought into contact with the cap plate 151 more tightly by fitting the sealing member 159 around the protrusion 158b, so as to provide more secure sealing between the cap plate 151 and the short-circuit plate 158.

In the current embodiment, the sealing member 159 including an insulating material and having, e.g., an O-ring shape, may be coupled to the protrusion 158b of the short-circuit plate 158. However, other configurations of a sealing member are included within example embodiments, e.g., an insulation adhesive or other sealing material may be used to form a sealing member to be disposed between the cap plate 151 and the short-circuit plate 158. That is, the material of the sealing member 159 is not limited.

In the current embodiment, the reversible plate 157 may be disposed on the bottom surface of the cap plate 151, and the sealing member 159 may be disposed between the top surface of the cap plate 151 and the short-circuit plate 158. Therefore, in a state where the top surfaces of the reversible plate 157 and the cap plate 151 are exposed, the short-circuit plate 158 may be sealed.

Figure 6:
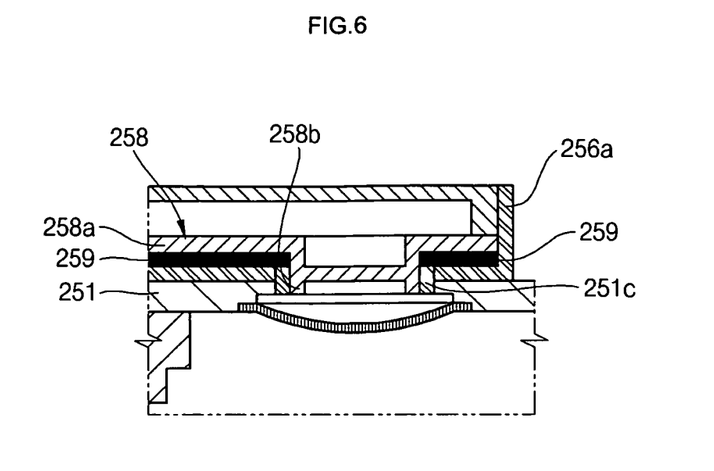
FIG. 6 illustrates an enlarged cross-sectional view of portion A in a secondary battery according to another embodiment.

FIG. 6 is an enlarged cross-sectional view of portion A of a secondary battery according to another embodiment.

Referring to FIG. 6, a secondary battery may include a first upper insulation member 256a between a sealing member 259 and a cap plate 251. The sealing member 259 and the first upper insulation member 256a may have different shapes from the shapes of the sealing member 159 and the first upper insulation member 156a of the previous embodiment described with reference to FIGS. 1 through 5. Except for the sealing member 259 and the first upper insulation member 256a, other elements, e.g., an electrode assembly, a first electrode terminal, a second electrode terminal, a case, and a cap assembly, of the secondary battery of the current embodiment are identical to the electrode assembly 110, i.e., to the respective first electrode terminal 120, second electrode terminal 130, case 140, and cap assembly 150 of the secondary battery of the previous embodiment described with reference to FIGS. 1 through 5. Thus, descriptions of the identical elements will not be repeated.

The sealing member 259 may be disposed between a short-circuit plate 258 and the first upper insulation member 256a, e.g., between a horizontal portion 258a of the short-circuit plate 258 and a horizontal portion of the first upper insulation member 256a parallel to the horizontal portion 258a. As such, the sealing member 259 may not contact an upper surface of the cap plate, i.e., may contact only a short-circuit hole 251c. In addition, the sealing member 259 may make a tight contact with an outer surface of a protrusion 258b of the short-circuit plate 258. The sealing member 259 may seal a wider area between the short-circuit plate 258 and the first upper insulation member 256a, e.g., as compared with the sealing member 159 in FIG. 3. Thus, prevention of permeation of contaminants between the first upper insulation member 256a and the short-circuit plate 258 may be further improved. Accordingly, abnormal behavior of the secondary battery may be more reliably prevented. The sealing member 259 may be a rubber O-ring or may be formed of an insulation adhesive.

The first upper insulation member 256a may be disposed between the short-circuit plate 258 and the cap plate 251. The first upper insulation member 256a may include a stepped part corresponding to the shape of the sealing member 259.

As described above, in the secondary battery of the embodiments, the sealing member may be disposed between the short-circuit plate and the cap plate to prevent abnormal operations of the secondary battery caused by permeation of contaminants or damages. Furthermore, according to the secondary battery of the embodiments, sealing of the short-circuit plate can be performed in a state where the reversible plate is disposed on the bottom surface of the cap plate and the cap plate is exposed. Therefore, the sealing operation may be efficiently performed. In addition, structures disposed on the top surface of the cap plate may have various shapes and location.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A secondary battery, comprising:
   an electrode assembly having a first electrode plate, a second electrode plate, and a separator disposed between the first and second electrode plates;
   a case accommodating the electrode assembly; and
   a cap assembly coupled to the case, the cap assembly including:
      a cap plate sealing the case and having a short-circuit hole,
      a short-circuit plate covering the short-circuit hole of the cap plate, the short-circuit plate being spaced apart from an outer surface of the cap plate and including a protrusion inserted through the short-circuit hole,
      a reversible plate adjacent the short-circuit hole, and
      a sealing member between the cap plate and the short-circuit plate,
      wherein the protrusion of the short-circuit plate has a hollow cylindrical shape, a blocking part being disposed inside the protrusion to divide an interior of the protrusion into upper and lower regions.

2. The secondary battery as claimed in claim 1, wherein the short-circuit plate includes a flat portion above the cap plate, and the protrusion extends from the flat portion into the short-circuit hole, first and second surfaces of the short-circuit plate being surfaces of the flat portion and the protrusion, respectively.

3. The secondary battery as claimed in claim 1, wherein the protrusion extends toward the reversible plate.

4. The secondary battery as claimed in claim 1, wherein the sealing member includes a hole therethrough, the protrusion being inserted into the hole.

5. The secondary battery as claimed in claim 4, wherein the sealing member includes a rubber material, the rubber material being shaped into repeated ridges and furrows on top and bottom surfaces of the sealing member.

6. The secondary battery as claimed in claim 4, wherein an inner diameter of the sealing member directly contacts and surrounds an outer diameter of the protrusion.

7. The secondary battery as claimed in claim 1, wherein the reversible plate includes a downwardly-convex round part and a rim part fixed to the cap plate.

8. The secondary battery as claimed in claim 7, wherein the round part of the reversible plate is configured to reverse and contact the protrusion of the short-circuit plate, when an inside pressure of the secondary battery is greater than a set value.

9. The secondary battery as claimed in claim 1, wherein the sealing member includes an adhesive material.

10. The secondary battery as claimed in claim 1, wherein the reversible plate and the sealing member contact opposite surfaces of the cap plate.

11. The secondary battery as claimed in claim 1, wherein the reversible plate is electrically connected to the second electrode plate.

12. The secondary battery as claimed in claim 1, wherein the short-circuit plate is electrically connected to the first electrode plate.

13. The secondary battery as claimed in claim 1, wherein an upper insulation member contacts the sealing member, a first surface of the short-circuit plate, and the cap plate, the sealing member separating a second surface of the short-circuit plate from the upper insulation member.

14. The secondary battery as claimed in claim 13, wherein the upper insulation member is disposed between the sealing member and the cap plate.

15. The secondary battery as claimed in claim 1, further comprising a first electrode terminal inserted through a side of the cap plate, the first electrode terminal including:
   a first collecting plate electrically connected to the first electrode plate; and
   a first terminal column electrically connected to the first collecting plate and inserted through the cap plate and the short-circuit plate.

16. The secondary battery as claimed in claim 15, further comprising a first terminal plate coupled to the first terminal column, the first terminal plate including:
   a terminal coupling part through which the first terminal column is inserted; and
   a pressure reinforcement part extending horizontally from the terminal coupling part and disposed on a top surface of the short-circuit plate.

17. The secondary battery as claimed in claim 16, further comprising an insulation cover configured to cover top and lateral surfaces of the pressure reinforcement part.

18. The secondary battery as claimed in claim 1, further comprising an upper insulation member between the cap plate and the short-circuit plate, the upper insulation member and the sealing member being separate and different layers.

19. The secondary battery as claimed in claim 16, wherein the pressure reinforcement part extends horizontally over the protrusion.

20. A secondary battery, comprising:
  an electrode assembly having a first electrode plate, a second electrode plate, and a separator disposed between the first and second electrode plates;
  a case accommodating the electrode assembly; and
  a cap assembly coupled to the case, the cap assembly including:
    a cap plate sealing the case and having a short-circuit hole,
    a short-circuit plate covering the short-circuit hole of the cap plate, the short-circuit plate being spaced apart from an outer surface of the cap plate and including a protrusion inserted through the short-circuit hole,
    a reversible plate adjacent the short-circuit hole, and
    a sealing member between the cap plate and the short-circuit plate,
  wherein an edge of the cap plate defining the short circuit-hole has a predetermined inner diameter, the inner diameter of the short-circuit hole directly contacting and surrounding an outer diameter of the protrusion of the short-circuit plate.

* * * * *